United States Patent [19]

Young et al.

[11] Patent Number: 5,781,911
[45] Date of Patent: Jul. 14, 1998

[54] INTEGRATED SYSTEM AND METHOD OF DATA WAREHOUSING AND DELIVERY

[75] Inventors: Edward T. Young, Fremont, Calif.; Dennis Yong; Lim Liat, both of Singapore, Singapore; James K. C. Tong, Mountain View, Calif.; Viktor C. H. Cheng, Foster City, Calif.; Judy K. Rawls, San Jose, Calif.

[73] Assignee: D2K, Incorporated, Singapore, Singapore

[21] Appl. No.: 711,526

[22] Filed: Sep. 10, 1996

[51] Int. Cl.$^6$ .................................................. G06F 17/30
[52] U.S. Cl. ........................... 707/201; 707/104; 707/10; 707/2; 705/26; 705/28
[58] Field of Search ........................... 707/1-4, 10, 200, 707/201, 104; 1/1; 705/26, 28

[56] References Cited

U.S. PATENT DOCUMENTS 5,341,474  8/1994  Gelman et al. ................... 395/200.36
5,403,147  4/1995  Tanaka ............................ 414/786
5,563,999  10/1996  Yaksich .......................... 707/507

*Primary Examiner*—Maria N. Von Buhr
*Attorney, Agent, or Firm*—Steven F. Caserza; Flehr Hohbach Test Albritton & Herbert

[57] ABSTRACT

A system and method is capable of providing a much more effective enterprise-wide decision support system. It consists of an integrated end-to-end solution including automatic generation of data warehouses or data marts integrated with automatic delivery of information from the data warehouses or data marts to knowledge workers throughout the enterprise using a "publish and subscribe" paradigm for dissemination of the information at any time, to any places, in any formats to any number of knowledge workers. This integration allows information in the data warehouses or data marts to be delivered immediately after every refresh of the data warehouses or data marts thereby allowing maximum utilization of the valuable information in the data warehouses or data marts throughout the enterprise to gain the most optimum decision support.

8 Claims, 4 Drawing Sheets

INTEGRATED SYSTEM AND METHOD OF DATA WAREHOUSING AND DELIVERY

BACKGROUND

1. Field of the Invention

This invention pertains to information processing and delivery systems, and more particularly to a novel method for extracting data from production on-line transaction systems and processing that data into information and distributing the information therefrom.

2. Description of the Prior Art

It is known in the prior art to provide some degree of automatic generation of data warehouses while separately allowing the delivery of information from these warehouses through a "pull" method whereby information are accessed and retrieved directly by knowledge workers using query or reporting tools. In such prior art systems, there is no integration between the process of generation of data warehouses and the process of delivery of information to knowledge workers. This lack of integration means that it is not possible to automatically provide knowledge workers with fresh information from the data warehouses immediately after every refresh of the data warehouse using new data from operational systems.

According to "Building the Date Warehouse" by W. H. Inmon, a book published by QED Technical Publishing Group, "a data warehouse is the focal point of the architecture for information processing for modern computer systems. The data warehouse supports informational (i.e., DSS-decision support) processing by providing a solid foundation of integrated, corporatewide historical data from which to do management analysis. The data warehouse provides the basis for corporate integration in a world of older unintegrated application systems." It further defines a data warehouse as "a subject-oriented, integrated, time-variant and non-volatile collection of data in support of management's decision-making process."

According to "DATAMARTS: Coming to an IT Mall Near You!" by Sarah E. Varney, Datamation Jun. 1, 1996, "data marts bring the data warehouse concept to small and medium-sized businesses and to departments within lager companies. Rather than store all enterprise data in one monolithic database, data marts contain a subset of the data for a single aspect of a company's business—e.g. finance, inventory or personnel."

Other relevant references are: "Using the Data Warehouse" by W. H. Inmon & Richard D. Hackathorn, a book published by Wiley-QED; "Data Marts: Low Cost, High Appeal" by J. Foley & B. DePompa, Information Week Mar. 18, 1996; and Informatica Powermart Suite Version 3.0 Technical Overview, Summer 1996 from Informatica Corporation.

FIG. 1 shows an example of a prior art data mart architecture. After the data definitions of the data mart have been designed using the designer module, the extraction, transformation and loading manager then calls on the extractor, transformation and loader modules to respectively extract the data from the data sources, transform the extracted data and then loads them into the data marts according to the schedule defined by the system administrator using the system administrator module. Once this is completed the information in the data mart is then available to be "pulled" or accessed by an end-user using an information access tool such as Microsoft Access, Microsoft Excel or Powersoft InfoMaker.

SUMMARY

Besides the "pull" method, enterprises also need a "push" method of delivery as this will allow enterprises to increase as well as have more widespread utilization of information in their data warehouses. Instead of many knowledge workers having to "pull" information themselves, the "push" method allows information to be broadcast or multicast to them at any time, as often as needed, and in any formats required.

In accordance with the teachings of this invention, it has been determined that there would be great usefulness in providing a technology that integrates the automatic generation of data warehouses or data marts with the automatic delivery of information from these data warehouses or data marts. This is complemented with "publish and subscribe" paradigm to allow information from the data warehouses or data marts to be widely published and for the information to be subscribed to by any knowledge worker so that updated information from the data warehouses or data marts are not only made available but also can be immediately and automatically disseminated for "just in time" access of information. In accordance with the teachings of this invention, the current information is made available and delivered to the right people at the right places at the right times in the right formats for each.

DETAILED DESCRIPTION

Overview

Figure 1:
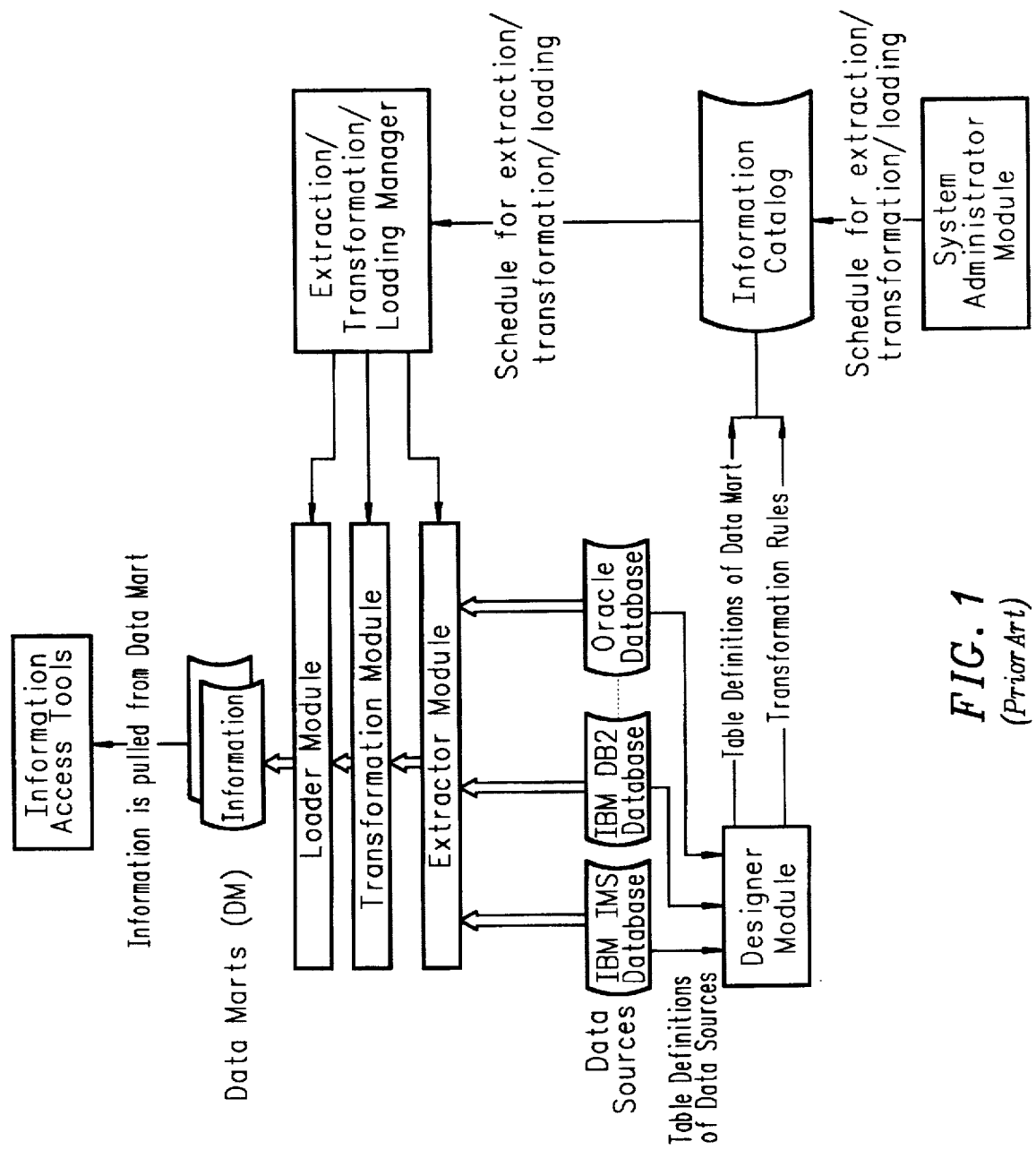
FIG. 1 is a block diagram of a prior art data mart architecture.
Figure 2:
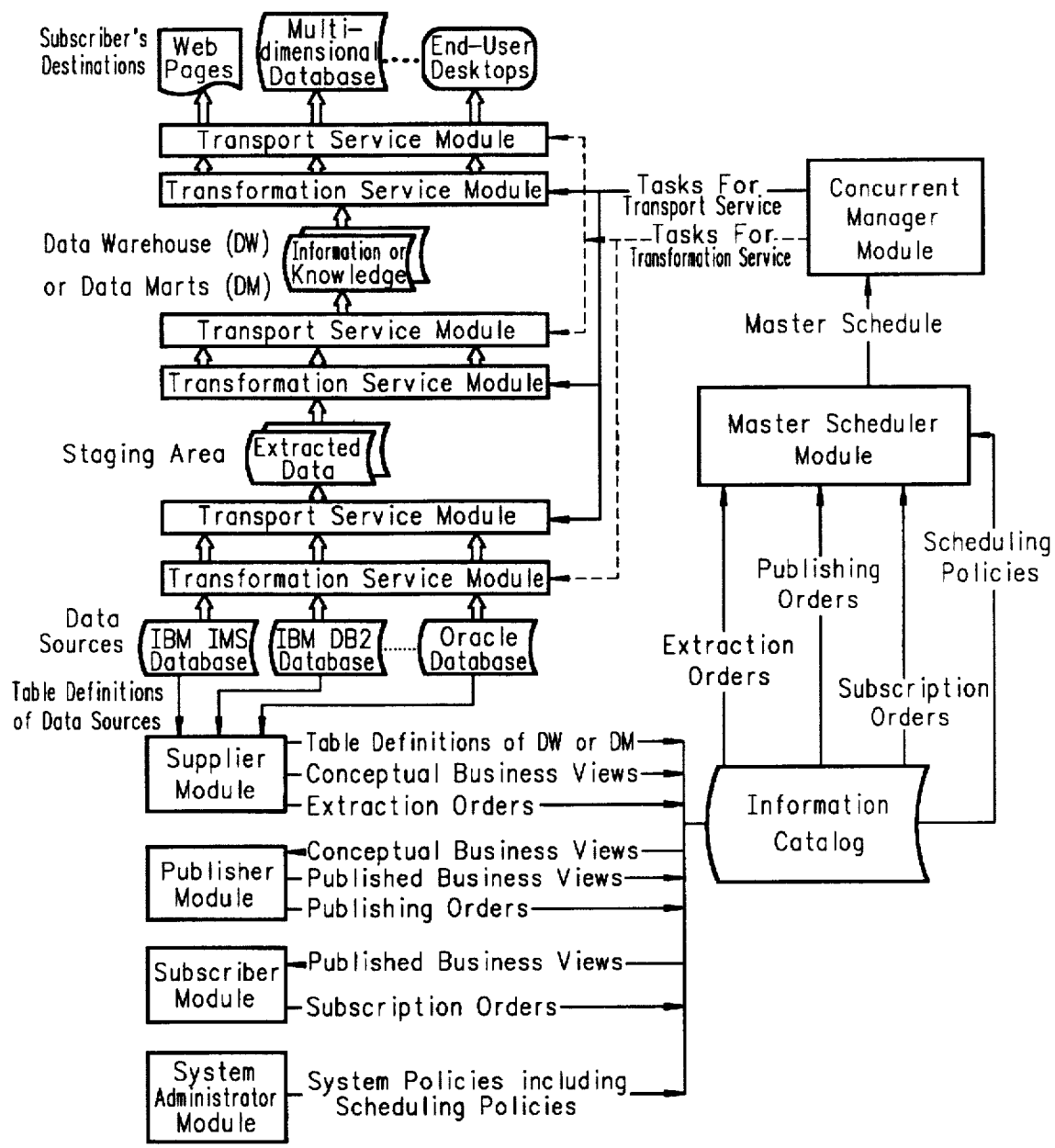
FIG. 2 is a block diagram depicting one embodiment of the system and method of this invention.

The following briefly describes one embodiment of this invention. FIG. 2 depicts the operation and interaction between the following modules:

Supplier Module
Publisher Module
Subscriber Module
System Administrator Module
Master Scheduler Module
Concurrent Manager Module
Transport Module
Transformation Module Supplier Module The purpose of the supplier module is to specify what data are to be extracted from the various Data Sources and the transformations to be performed on the data extracted. The user of this module is typically a database administrator. He first imports the table definitions of selected tables of the Data Sources he is interested in. The Data Sources can be, for example, an IBM IMS database, an IBM DB2 database or an Oracle database.

The user next derives new table definitions and new column definitions based on the imported table definitions. The user also specifies any transformation that may be required, such as a transformation of the data type from EBCDIC to ASCII. Each of these transformations is specified as a task and these tasks can be combined into an ordered set called a tasklist.

Before we proceed further to explain the Supplier Module let us first define a tasklist, since it plays an important role in this invention. A tasklist is defined as a set of tasks organized as workflow whereby a task is defined as an atomic operation. An example of a task is as follows:

A data conversion from ASCII and EBCDIC or vice versa

An arithmatic operation on two or more columns from one or more tables

A comparison between two numbers

A date conversion

A string manipulation

Besides operations on columns of tables, a task can also be as follows:

A file transfer

A file format conversion

A data compression

A database operation to be performed at a single database server

An extraction of data from a certain table of a Data Source

There are basically five types of atomic operations:

an extraction of data from a Data Source.

a loading or refreshing of a Data Warehouse or Data Mart.

a retrieval of data from a Data Warehouse or Data Mart.

a transformation of data extracted from a Data Source or retrieved from a Staging Area or a Data Warehouse or Data Mart.

a transport of data from a Data Source to a Staging Area, from a Staging Area to a Data Warehouse or Data Mart, or from a Data Warehouse or Data Mart to a destination specified by a subscriber.

Figure 3:
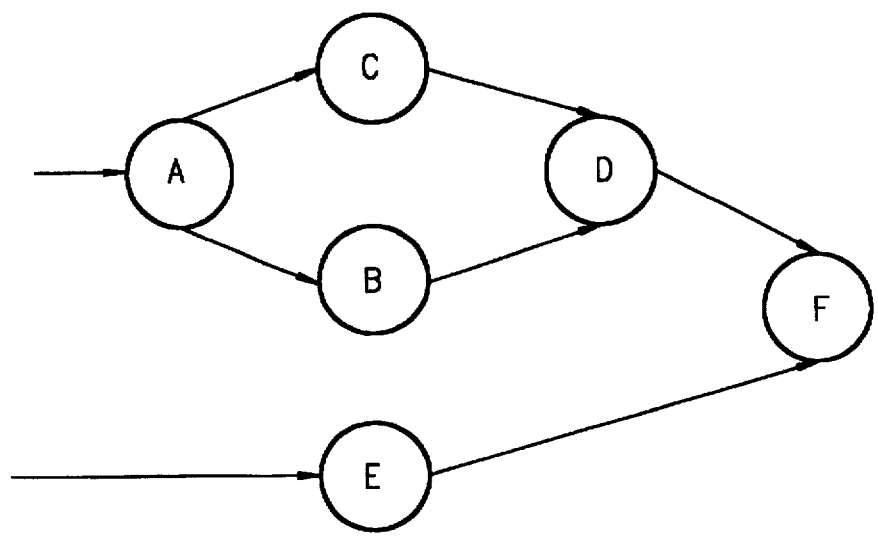
FIG. 3 is an example of a workflow of a task list.

A tasklist can also be made up of other tasklists or a combination of tasks and tasklists. As mentioned earlier a tasklist is a workflow of tasks. An example of a workflow of a tasklist is shown in FIG. 3. In this figure each of the circles represents a task. Task A and E may proceed in parallel, even on different machines. Task B and C cannot start until A has been completed. D cannot start until B and C are done, and finally F cannot start until D and E have been completed. The arrows pointing to a circle represent the dependencies of a task.

Referring again to FIG. 2, the new table definitions derived from the table definitions of the Data Sources are usually in third normal form. Next, the primary and foreign key relationships of the new tables are defined and stored in the Information Catalog. These table definitions are then used as the table definitions of the Data Warehouse or Data Mart. After this a Conceptual Business View of the selected tables is then built up and stored in the Information Catalog. Each Conceptual Business View is a view or a data model of a group of tables joined in a manner that reflects the business semantics of the database of the data source.

Lastly, an Extraction Order which contains a dependency list, a tasklist and the time to start executing the tasklist is specified. A tasklist in an Extraction Order usually contains tasks for extraction from a Data Source, tasks for transformation, tasks for transporting the transformed data into a Staging Area.

To illustrate the process within the Supplier Module let us consider an example in which a Data Warehouse or a Data Mart called PERSONNEL is to be built. The data to populate PERSONNEL comes from, say, two different Data Sources which are of different database types from different computer systems, one being a Staff database and the other a Payroll database. Let us say that PERSONNEL is to contain three tables of which two come from the Staff database, namely EMPLOYEE and SKILL tables whose table definitions are as follows:

| Table Name | Column Name | Data Type |
| --- | --- | --- |
| EMPLOYEE | Employee_Number | EBCDIC |
|  | Name | EBCDIC |
|  | Address | EBCDIC |
|  | Sex | EBCDIC |
| SKILL | Employee_Number | EBCDIC |
|  | Skill | EBCDIC |

Let us say that these definitions are to be used as the corresponding table definitions in the PERSONNEL Data Warehouse or Data Mart except that all the data types are to be transformed from EBCDIC to ASCII. This transformation is specified by defining a tasklist to transform from EBCDIC to ASCII for each column of the tables.

The definition of the third table of PERSONNEL is derived from the Payroll database, say, PAY table whose definition is as follows:

| Table Name | Column Name | Data Type |
| --- | --- | --- |
| PAY | Employee_Number | ASCII |
|  | Pay_Amount | ASCII |
|  | Pay_Month | ASCII |

Let us say that this definition is accepted as the definition of the corresponding third table of PERSONNEL without any change.

Next, the EMPLOYEE table is defined as having its Employee_Number column as a primary key while the SKILL and PAY tables are defined as having their Employee_Number column as a foreign key referencing the EMPLOYEE table. These definitions are then stored in the Information Catalog. These three tables then form the tables of the Data Warehouse or Data Mart. The definitions obtained so far are then stored in the Information Catalog.

After this, a Conceptual Business View of the three tables is then defined which can be of the following form:

| EMPLOYEE class | Joins or Navigation Path |
| --- | --- |
| <About EMPLOYEE> | Nil |
| Employee_Number | Nil |
| Name | Nil |
| Address | Nil |
| Sex | Nil |
| <EMPLOYEE has SKILL> | EMPLOYEE.Employee_Number = SKILL.Employee_Number |
| Skill | EMPLOYEE.Employee_Number = SKILL.Employee_Number |
| <EMPLOYEE has PAY> | EMPLOYEE.Employee_Number = PAY.Employee_Number |
| Pay_Amount | EMPLOYEE.Employee_Number = PAY.Employee_Number |
| Pay_Month | EMPLOYEE.Employee_Number = PAY.Employee_Number |

*This business view together with the joins or navigation path

This business view together with the joins or navigation path between the three tables to obtain this view are then stored in the Information Catalog.

Figure 4A:
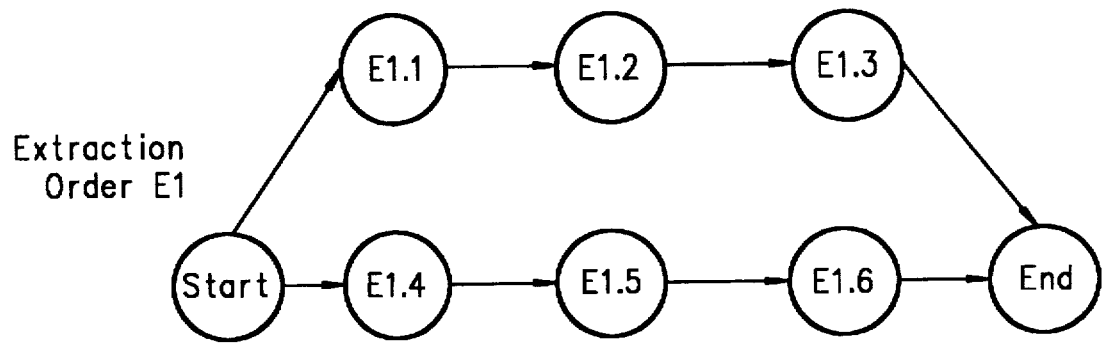
FIG. 4A and 4B are examples of tasklists associated with extraction orders.

Next, by way of example, two Extraction Orders, say E1 and E2 are defined. E1 is an order to extract data from the PERSONNEL database and has the following dependency list and tasklist with the workflow of the tasklists of these two Extraction Order shown in FIG. 4:

Dependency List: Nil

Tasklist:
- E1.1 Extract the data of the EMPLOYEE table from the Personnel database.
- E1.2 Perform the EBCDIC transformation on each column of the extracted data of the EMPLOYEE table.
- E1.3 Transport the extracted and transformed data of EMPLOYEE table to a Staging Area called, say EMP_DATA.
- E1.4 Extract the data of the SKILL table from the same Personnel database.
- E1.5 Perform the EBCDIC transformation on each column of the extracted data of the SKILL table.
- E1.6 Transport the extracted and transformed data of SKILL table to the EMP_DATA Staging Area.

Figure 4B:
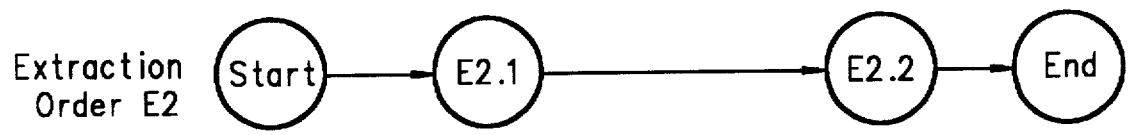

E2 is an order to extract data from the Payroll database and has the following dependency list and tasklist, as depicted in FIG. 4b:

Dependency List:

Tasklist:
- E2.1 Extract the data of the PAY table from the Payroll database.
- E2.2 Transport the extracted data of PAY table to the EMP_DATA Staging Area.

As both these Extraction Orders are for different databases they can be executed concurrently and independently of each other. The Extraction Orders also contain the time for starting the execution of the tasklist, say midnight every night.

Publisher Module

This module is used by someone who is typically a business analyst within an organization. Using the publisher module he first retrieves a Conceptual Business View from the Information Catalog. He may enhance this view by defining new columns or new tables to add to the Data Warehouse or Data Mart. Each of the new column or table defined is a transformation operation or a set of transformation operations which together form a tasklist. This enhanced Conceptual Business View is then stored in the Information Catalog.

Next, the publisher uses the enhanced Conceptual Business View to determine what should be published. A way he does this is to eliminate certain items from the enhanced Conceptual Business View. Another way could be to specify filters that limit only certain records of data of the enhanced Conceptual Business View to be retrieved by subscribers. The result of this item elimination or filtering is a Published Business View which is then stored in the Information Catalog.

After this the publisher defines a Publishing Order which is an order to retrieve the extracted and transformed data in the Staging Area, perform any transformations that he has specified in defining the enhanced Conceptual Business View, and then load the resultant data into the Data Warehouse or Data Mart. As in the case of the Extraction Order created by the person using the Supplier Module, this Publishing Order is a tasklist which may include a set of timings as to when the execution of the tasklist is to start.

Let us continue with the earlier example to illustrate this process. The publisher first retrieves the EMPLOYEE class which is the Conceptual Business View stored in the Information Catalog. Let us say that from this view he defines a new column called Year_to_date_Pay to be added to the PAY table. This column is a derived item obtained by summing the Pay_Amount from the beginning of the year to the current month. The derivation of this item is considered another form of transformation. This new derived column when added to the original Conceptual Business View becomes an enhanced Conceptual Business View as shown below:

EMPLOYEE class

<About EMPLOYEE>

Employee_Number

Name

Address

Sex

<EMPLOYEE has SKILL>

Skill

<EMPLOYEE has PAY>

Pay_Amount

Pay_Month

Year_to_date_Pay

This enhanced Conceptual Business View together with the new transformation defined for the Year_to_date_Pay item is then stored in the Information Catalog.

Next, the publisher defines views to be published. Suppose he wants to publish a view for a specific group of subscribers who are clerks. Such a view to be published could be as follows:

EMPLOYEE class for clerks to access

<About EMPLOYEE>

Employee_Number

Name

Address

Sex

<EMPLOYEE has PAY>

Pay_Amount . . . less than 1000

Pay_Month

Year_to_date_Pay

Here we have defined a view which has some items eliminated from the enhanced EMPLOYEE class view, <EMPLOYEE has SKILL> and Skill. In addition, a filter has been added to this smaller view, namely the Pay_Amount to be less than 1000 i.e. the clerks are only allowed to see information of those employees earning a Pay_Amount less than $1000. This then becomes a Published Business View which is then stored in the Information Catalog.

Figure 5:
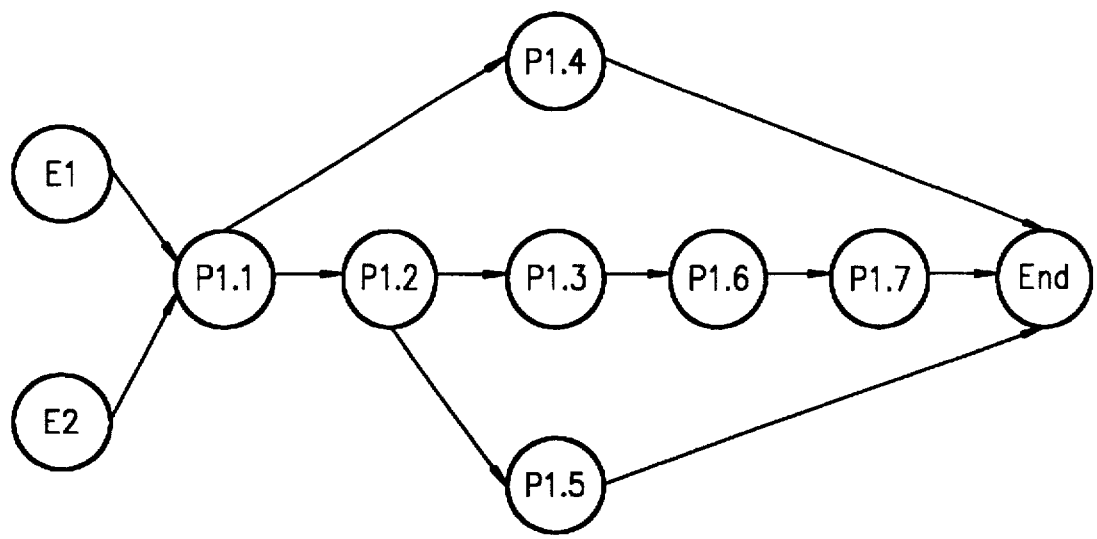
FIG. 5 is an example of a task list associated with a publishing order.

After this the publisher specifies a Publishing Order, say P1, which contains the following illustrative dependency list and tasklist with the workflow of the tasklist of this Publishing Order shown in FIG. 5:

Dependency List: E1, E2

Tasklist:
- P1.1 Retrieve the EMPLOYEE data in the EMP_DATA Staging Area and transport it to a database server, say DS1 that is be used as the PERSONNEL Data Warehouse or Data Mart.
- P1.2 Retrieve the SKILL data in the EMP_DATA Staging Area and transport it to the same database server, namely DS1.
- P1.3 Retrieve the PAY data in the EMP_DATA Staging Area and transport it to the same database server, namely DS1.
- P1.4 Load the EMPLOYEE data into the EMPLOYEE table of PERSONNEL in the DS1 database server.
- P1.5 Load the SKILL data into the SKILL table of PERSONNEL in the DS1 database server.

P1.6 Perform the transformation defined by the publisher, namely derive a new column called Year_to_date_Pay on the PAY data in the DS1 database server.

P1.7 Load the PAY data and the derived Year_to_date_Pay data into the PAY table of PERSONNEL in the DS1 database server.

This tasklist has two dependencies, namely it cannot start until the Extraction Orders E1 and E2 have been successfully executed. The Publishing Order P1 also contains the time for starting the execution of the tasklist, say, every Monday immediately after Extraction Orders E1 and E2 have been executed successfully. Subscriber Module This module is used by a subscriber who is typically an end-user who wants information or knowledge from the Data Warehouse or Data Mart either for himself or for his boss. This module allows the subscriber to view all Published Business Views that he is authorized to see by the publisher. From a Published Business View he then defines his Subscription Order. A Subscription Order comprises a set of items selected from the Published Business View, any transformation that he wants, the time and frequency of the information to be retrieved and delivered to him, the format that he wants the information to be in when he receives it and the addresses of where the information is to be sent. This Subscription Order is then translated into a tasklist together with the timings specified and stored in the Information Catalog.

Let us illustrate this with the same earlier example. Suppose subscriber A accesses the Published Business View which is called the EMPLOYEE class for clerks to access. Let us say he selects the following items from this view:

Employee_Number

Name

Pay_Amount

Pay_Month

Year_to_date_Pay

Figure 6:
FIG. 6 is an example of a task list associated with a subscription order.

Let us say he also defines a new item such as Bonus which is a one-tenth of every month's Pay_Amount. Deriving this new item is also considered a transformation. This new item is to be added to the above items he has selected. He next specifies that he wants this information to be retrieved every Monday morning and delivered to his and his manager's PC in Excel spreadsheet format not later than 8.00 am. All these specifications constitute a Subscription Order which would be translated by this Subscriber Module into a tasklist with the workflow of the tasklist as follows shown in FIG. 6:

Dependency List: P1

Tasklist:

S1.1 Generate data access statement that conforms to the requested items from the PERSONNEL Data Warehouse or Data Mart. If the DS1 database server used for PERSONNEL is an SQL database the data access statement is an SQL statement.

S1.2 Retrieve the information requested from the PERSONNEL Data Warehouse or Data Mart using the generated SQL.

S1.3 Perform transformation to derive the Bonus item using the information retrieved from PERSONNEL.

S1.4 Transform the information retrieved including the Bonus item into Excel spreadsheet format.

S1.5 Transport the Excel spreadsheet information to the PC of the subscriber and his manager.

This Subscription Order also contains the time of delivery, namely every Monday not later than 8 am. This order is then stored in the Information Catalog.

System Administrator Module

This module is used by a system administrator of the Data Warehouse or Data Mart system. Such a person would typically be a database administrator. He uses this module to define System Policies such as the following:

Defining the users who can use the Data Warehouse or Data Mart system i.e. the logon ids, passwords and privileges of suppliers, the publishers and the subscribers as well as other system administrators.

Defining the priority of the various users of this system.

Defining the constraints imposed on scheduling carried out by the Master Scheduler Module. A constraint could be that the timings for extraction of data from the Data Source cannot be changed. Another constraint could be if there is a conflict between a Publishing Order and a Subscription Order the former takes precedence. Another constraint could also be that if processing of a Publishing or a Subscription Order is still in progress and that the time for extraction of data from the Data Source is due, the processing of the outstanding Publishing Order or Subscription Order could be either suspended or aborted.

Master Scheduler Module

This module takes as its input the three different types of orders stored in the Information Catalog, namely the Extraction Orders, the Publishing Orders and the Subscription Orders as well as the Scheduling Policies defined by the system administrator using the System Administrator Module.

It then schedules these three different types of orders according to the Scheduling Policies defined by the system administrator. One scheduling policy could be scheduling by event using the dependency lists in the Extraction Orders, Publishing Orders or the Subscription Orders. Another policy could be scheduling by time specified in the Extraction Orders, Publishing Orders or the Subscription Orders. And yet another policy could be scheduling by some combination of these policies as well as with other policies such as priority of users. The output of this scheduling of the Extraction Orders, Publishing Orders and Subscription Orders constitute the Master Schedule.

After a Master Schedule has been generated, the Master Scheduler Module then issues the Extraction Orders, the Publishing Orders and the Subscription Orders according to the Master Schedule to the Concurrent Manager Module for these orders to be executed.

While issuing orders from its Master Schedule the Master Scheduler Module would also be informed by the Information Catalog of new Extraction, Publishing or Subscription Orders that have been created. Upon receiving these new orders it would then reschedule all outstanding orders including those in the Master Schedule to create an updated Master Schedule which it then used to issue orders to the Concurrent Manager Module.

Concurrent Manager Module

This module takes as its input the orders issued by the Master Scheduler Module. More than one order may be issued by the Master Scheduler Module to this module to be executed. It is therefore designed to manage the execution of many orders concurrently.

It first reads the tasklist within each order and then controls and sequences the operations of the various tasks in the tasklist. For each task in the tasklist it first resolves the logical names referred in the task into physical addresses using a directory such as X.500 or Microsoft Exchange that is interfaced to this module. These names could be names of Data Sources, Staging Area, Data Warehouse or Data Mart, or names of users such as publishers, subscribers, or names of locations such as subscribers' destinations. Next, the module determines whether the task is a transformation or a transport task. It then sets up the connection to the physical addresses that has been resolved from the logical names in the task and calls on the appropriate service to execute the task, i.e. either the Transformation Service Module or the Transport Service Module. After an order has been successfully executed, the Concurrent Manager Module then informs the Master Scheduler Module to receive to next order for execution.

The Concurrent Manager Module is also designed to handle restart and recovery should the connection to the Transport Service or the Transformation Service fail or should the execution of the task fail to start or fail to complete.

Transport Service Module

This module is used to transport data from one location to another. The locations, which are physical addresses of logical names in a task resolved by the Concurrent Manager Module as earlier described, could be either the Data Sources, the Staging Area, the Data Warehouses or Data Marts or the Subscribers' Destinations. This module consists of two parts with one part being on the source location and the other on the destination location. The two parts work together to coordinate the data transport.

The Transport Service Module is designed to handle high volume data transfer (of the order of gigabytes) from the Data Sources to Staging Area or from Staging Area to Data Warehouses or Data Marts in a reliable and continuable manner. It does this by first breaking up a large file to be transported into small blocks and then transport one block at a time. For example, it could break up a gigabyte of data in a file to be transported into 1000 blocks of one megabyte each. Each megabyte of data would then be transport reliably across. Should a failure occur during the transport it would be able to continue the transfer of data from the affected block onwards instead of from the beginning of the file.

It has capability to compress the data before it is transported for high throughput as well as encrypt the data to provide a secured transfer of data. It is also designed to multicast information from Data Warehouses or Data Marts to many Subscribers' Destinations at one time.

Transformation Service Module

This module is used to perform the various transformations as defined in the tasks within the tasklist of the Extraction Orders, the Publishing Orders and Subscription Orders. It is called upon by the Concurrent Manager Module to perform the transformations. It consists of many small functions each designed to handle one particular type of transformation. It is also able to handle restart and recovery should the execution of the transformation fail.

All publications and patent applications mentioned in this specification are herein incorporated by reference to the same extent as if each individual publication or patent application was specifically and individually indicated to be incorporated by reference.

The invention now being fully described, it will be apparent to one of ordinary skill in the art that many changes and modifications can be made thereto without departing from the spirit or scope of the appended claims.

What is claimed is:

1. An integrated system of data warehousing and data delivery comprising:

a supplier module for a user to define an extraction order comprising a first tasklist of what data are to be extracted from one or more existing data processing systems, what transformations are to be performed and into what one or more databases said extracted and transformed data are to be stored, and a set of timings of when said first tasklist is to be executed;

a publisher module for a user to define s publisher order comprising a second tasklist of which of said extracted and transformed data we to be published, what transformations are to be performed on the published data and into what one or more databases said published data are to be stored, and a set of timings of when said second tasklist is to be executed;

a subscriber module for a user to define a subscription order comprising a third tasklist of which of said published data are to be retrieved, what transformations are to be performed on the retrieved data and the destinations the retrieved data are to be delivered, and a set of timings of when said third tasklist is to be executed;

a master scheduler module for scheduling said extraction orders said publisher order and said subscription order to produce a master schedule of when these orders are to be executed and in what sequence;

a concurrent manager module for managing the concurrent execution of said extraction order, said publisher order and said subscription order according to said master schedule;

a transport service module for transporting data from said one or more existing data processing systems to said databases of said extracted and transformed data, from said databases of said extracted and transformed data to said databases of said published data, and from said databases of said published data to the destinations specified in said subscription order; and a transformation service module for transforming data according to specifications defined by a user using one or more of said supplier module, said publisher module and, said subscriber module.

2. An integrated system of data warehousing and date delivery as in claim 1 further comprising:

a system administrator module for a user to specify scheduling policies used by said master scheduler module for producing said master schedule; and an information catalog for storing said extraction order, said publisher order, said subscription order, said scheduling policies and said master schedule.

3. An integrated system of data warehousing and date delivery as in claim 1 wherein one or more of said first, second, and third tasklists comprise a workflow of tasks to be executed.

4. A method of data warehousing and data delivery as in claim 3 further comprising the steps of:

specifying scheduling policies used by said step of scheduling to produce said master schedule; and storing said extraction order, said publisher order, said subscription order, said scheduling policies, and said master schedule in an information catalog.

5. An integrated system of data warehousing and date delivery as in claim 1 wherein one or more of said extraction order, said publisher order and said subscription order further comprises a dependency list that contains a set of events to trigger the execution of one or more of said extraction order, publisher order or subscription order.

6. A method of data warehousing and data delivery comprising the steps of:

defining an extraction order comprising a first tasklist of what data are to be extracted from one or more existing data processing systems, what transformations are to be performed and into what one or more databases said extracted and transformed data are to be stored, and a set of timings of when said first tasklist is to be executed, defining a publisher order comprising a second tasklist of which of said extracted and transformed data are to be published, what transformations are to be performed on the published data and into what one or more databases said Published data are to be stored, and a set of timings of when said second tasklist is to be executed;

defining a subscription order comprising a third tasklist of which of said published data are to be retrieved, what transformations are to be performed on the retrieved data and the destinations the retrieved data are to be delivered, and a set of timings of when said third tasklist is to be executed;

scheduling said extraction order, said publisher order, and said subscription order to produce a master schedule of when these orders are to be executed and in what sequence;

managing the concurrent execution of said extraction order, said publisher order and said subscriptions order according to said master schedule;

transporting data from said one or more existing data processing systems to said databases of said extracted and transformed data, from said databases of said extracted and transformed data to said databases of said published data, and from said databases of said published data to the destinations specified in said subscription order; and transforming data according to specifications in said extraction order, said publisher order and said subscription order.

7. A method of data warehousing and data delivery as in claim 6 wherein one or more of said first, second, and third tasklists comprise a workflow of tasks to be executed.

8. A method of data warehousing and data delivery as in claim 6 wherein one or more of said extraction order, said published order and said subscription order further comprises a dependency list that contains a set of events to trigger the execution of one or more of said extraction order, publisher and subscription order.

* * * * *

UNITED STATES PATENT AND TRADEMARK OFFICE
CERTIFICATE OF CORRECTION

PATENT NO. : 5,781,911
DATED : July 14, 1998
INVENTOR(S) : Young et al.

It is certified that error appears in the above-indentified patent and that said Letters Patent is hereby corrected as shown below:

In Column 1, at line 26, please replace the word "Date" with -- Data --.

In Column 1, at line 42, please replace the word "lager" with -- larger --.

In Column 4, at line 62, please delete the line in its entirety.

In Column 7, at line 13, please begin a new paragraph after the word "successfully." and starting with "Subscriber".

In Column 10, at line 6, please replace the letter "s" with -- a --.

In Column 10, at line 8, please replace the word "we" with -- are --.

Signed and Sealed this

Thirtieth Day of March, 1999

Attest:

Q. TODD DICKINSON

*Attesting Officer*  *Acting Commissioner of Patents and Trademarks*